Patented Jan. 20, 1925.

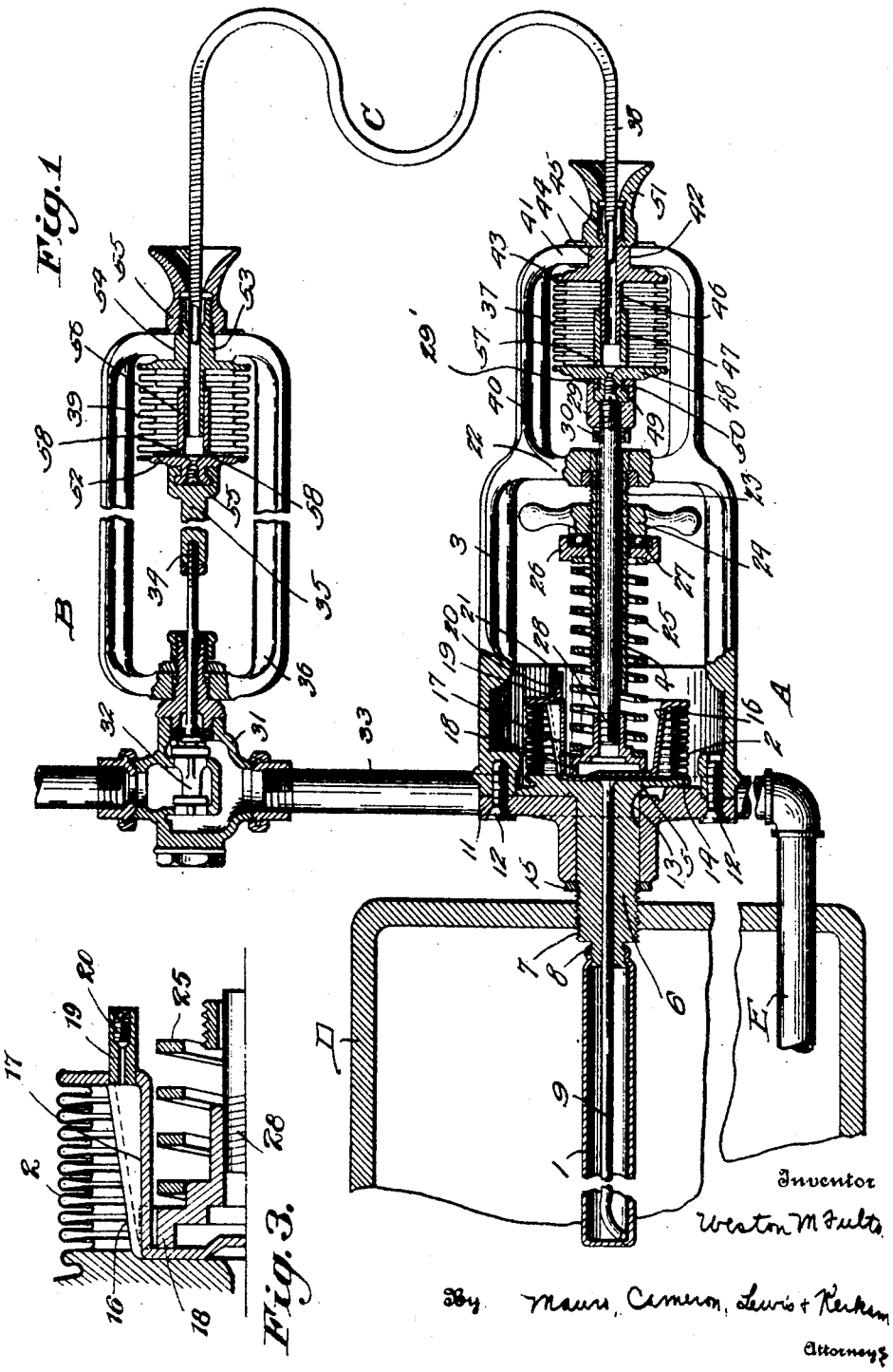

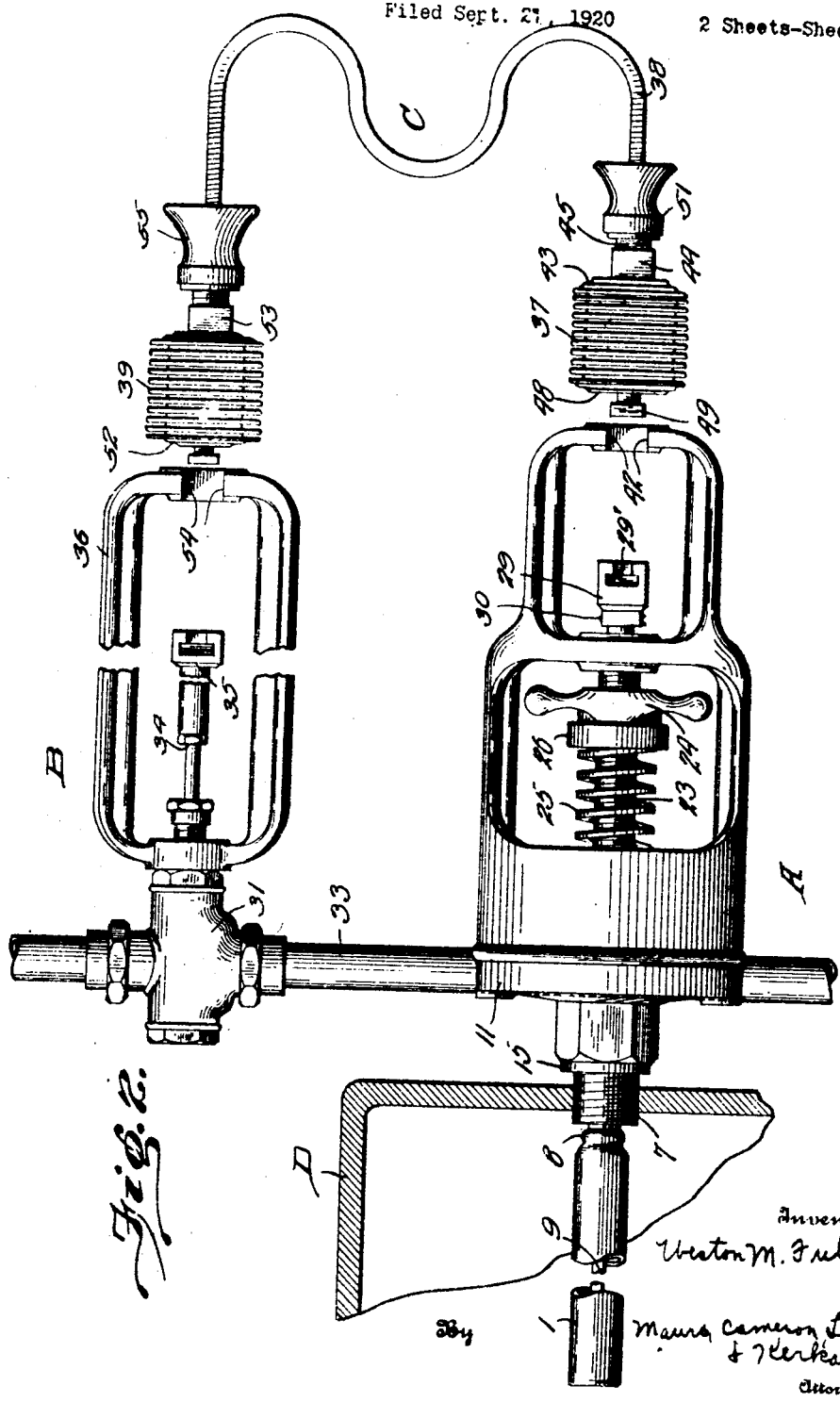

1,523,950

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TANK REGULATOR.

Application filed September 27, 1920. Serial No. 413,120.

*To all whom it may concern:*

Be it known that I, WESTON M. FULTON, a citizen of the United States of America, and a resident of Knoxville, Tennessee, have invented new and useful Improvements in Tank Regulators, which invention is fully set forth in the following specification.

This invention relates to temperature regulators and is an improvement on the construction shown, described and claimed in my United States Patent No. 1,300,717, granted April 15, 1919. The invention has for its objects to reduce the number of soldered joints in connection with the thermosensitive bulb and the thermosensitive flexible member; to reduce to a minimum the number of mechanical fluid-tight joints in the structure, to the end that liability of leakage from a tank or a container may be reduced to a minimum; to simplify the means whereby the transmission unit of said patent is attached to the thermostatic member and to the operated member, such as the valve member of the regulator; to avoid the possible twisting, and hence liability to rupture, of the flexible conduit of the power transmission unit; and to provide simple means for preventing injury to the parts when power is transmitted from the thermostat to the valve mechanism or other element to be controlled after said valve mechanism or element has reached its extreme position.

The invention is particularly applicable to the regulation of the temperature in hot water tanks. Such tanks are generally installed by ordinary plumbers, or other unskilled persons, and frequently have to be kept in order by janitors, or other unskilled mechanics, and it is, therefore, particularly desirable that the regulator mechanism be such as to be readily installed by people of this class without injury to the apparatus. The power transmission unit, being one of the exposed parts, is the one most liable to injury not only in the act of installing the same but during use, and the present invention is designed to facilitate the installation of the power transmission unit without undue strain upon the connecting conduit, or other parts, such as would occur upon twisting of the conduit, and also in case injury has occurred to said conduit to facilitate the removal thereof and substitution of a new unit by any unskilled workman without danger of injury to the parts or liability of their being assembled in such a way as to prevent perfect operation.

Furthermore, all thermostats for use in such installations possess what is technically known as a "lag", i. e. the temperature of the thermostat does not attain the temperature of the water surrounding the same for an appreciable period of time after the water has reached such temperature. It follows from this that, if the apparatus is set to close the valve controlling the heating medium at a given temperature of the water, the thermostatic element will continue to act and transmit power to the valve mechanism and other parts after the valve is closed, resulting in what is technically known as "overthrow" of the thermostatic element, and means must be provided to compensate for this overthrow to avoid injury to the parts.

Still another difficulty experienced in installations of this character is the liability of leakage to occur wherever there are brazed or soldered joints, and it is therefore extremely desirable to reduce these brazed or soldered joints to a minimum.

The invention consists in the various elements and combination of elements hereinafter described and defined in the claims, by means of which the objects above set forth are accomplished and the objections enumerated to structures of this kind are overcome.

The invention is illustrated in the accompanying drawings, in which—

Fig. 1 is a sectional view (parts being shown in elevation) of a tank regulator embodying the invention, the parts being shown in operative position and the tank and the heating-coil being indicated diagrammatically;

Fig. 2 is a side elevation of the tank regulator with the power transmission unit shown detached from the thermostat and the valve mechanism;

Fig. 3 is an enlarged fragmentary detail illustrating the means to prevent rotation between the transmission rod and the expansible and collapsible vessel.

Referring to the drawings in which like reference characters indicate like parts throughout, A is the thermostat element, B the valve element, C the power transmission unit, D the tank, and E the heating-coil.

The thermostat element A is composed of a thermosensitive bulb 1, an elastic expansible and contractible vessel 2, a frame 3, a power transmission rod 4, and means for adjusting the pressure on the expansible and collapsible vessel, to the end that the temperature at which the device is designed to act may be regulated.

The thermosensitive bulb 1 is preferably in the form of a drawn cup, and the fixed head 5 of the expansible and contractible vessel 2 is in the form of a flanged member provided with a hub portion 6 having a screw-threaded part 7 by means of which the thermostatic element A is attached to the tank D. The thermosensitive bulb 1 is first rolled or spun onto the inner end of the hub 6 and then soldered or brazed thereto, as shown at 8. The flexible wall of the expansible and collapsible vessel 2 is soldered or brazed to the head 5, and a conduit or tube 9 extends from the interior of the thermosensitive bulb 1 through the fixed head 5, to the end that communication between the bulb and the collapsible and expansible vessel 2 may be established. To secure the best results this communication should be of such a character as to trap or retain the vapors of the thermosensitive fluid within the bulb, said vapors, upon a rise of temperature, exerting their pressure upon and forcing the liquid out of the bulb into the collapsible and expansible vessel. Any suitable means that will thus effectively trap the vapors and prevent their passage out of the bulb may be employed but, preferably, the tube 9 has its inner terminal end, within the bulb 1, bent so as to come near the side wall of the bulb 1 to effect such trapping of vapors in the bulb and the expulsion of liquid only (upon a rise in temperature) from the bulb into the expansible and collapsible vessel 2. The frame 3 and the expansible and collapsible vessel 2 are secured together by means of a frame cap 11. This cap has an opening through which the hub 6 extends, the cap 11 being secured to the frame by screws 12. The under side of the head 5 has a slot 13 formed therein which is engaged by a lug 14 on the frame cap, to the end that relative turning movement between the frame cap and the fixed head of the expansible and collapsible vessel 2 may be prevented. There is also provided a locking nut 15 screw-threaded on the hub 6 to securely lock the frame cap and the head 5 together.

The movable head 16 of the expansible and collapsible vessel 2 is cup-shaped, as shown, and brazed or soldered to the tubular wall of the vessel. This movable head has a rib portion 17 stamped therein which engages a slot in the foot-piece 18 of the transmission rod 4, thereby preventing any turning movement between said foot-piece and the expansible and collapsible vessel 2. This stamped rib portion 17 also affords space for providing a filling opening 19 through which the expansible and collapsible vessel and the thermosensitive bulb are filled with a thermosensitive fluid, such as acetone or alcohol, the opening being then closed by a plug 20 and the latter preferably held in place by a cap-piece 21 brazed thereon.

It will be seen that, in the construction thus far described, the thermostatic element has but three brazed joints, to wit, where the two heads of the expansible and collapsible vessel 2 are brazed thereto and the joint where the bulb 1 is brazed to the hub 6. Furthermore, it will be observed that the connection of these parts to the frame 3, and to the tank D, is such that no strain is imposed upon such joints in the act of installation and that they are amply protected from exterior injury after being once installed.

The frame 3 is provided with a cross-bar 22 in which is firmly secured a tubular member 23 screw-threaded on its exterior surface and having a nut 24 thereon operated by suitable handles. The power transmission rod 4 extends through this tubular member 23 and through the opening in the cross-bar 22 of the frame. Surrounding the tubular member 23 and bearing upon the foot-piece 18 of the transmission rod 4 is a coiled spring 25. The other end of this spring bears against a thrust-piece 26 between which and the nut are preferably provided ball-bearings 27 to eliminate friction in adjusting the tension of the spring 25. The transmission rod 4 is preferably secured to the foot-piece 18 by a screw-threaded connection, as shown at 28, and extends up through the tubular piece 23 above the cross-bar 22 of the frame, its upper end being provided with screw-threads on which is received a screw-threaded nut 29 having a T-slot 29' (Fig. 2) formed therein. This nut 29 can be adjusted by screwing the same up or down on the threads of the rod 4 and fixed in any position by a cotter-pin 30 passing through the rod and between ears on the nut in a well-known way.

The valve mechanism B consists of a valve casing 31, and a valve 32 of any suitable kind working therein and controlling the flow of the heating fluid through pipe 33 to the coil E in the tank D. The valve stem is screw-threaded at 34 and, by means of said screw-threads, connected to a T-slotted member 35.

Secured on the valve casing is a frame 36, which frame serves to support one end of the power transmission unit C as hereinafter described. This power transmission unit consists of two expansible and collapsible vessels, one, 37, at the thermostatic end of a flexible tube 38 and one, 39, at the valve mechanism end of said tube.

The frame 3 is extended beyond the crossbar 22, as shown at 40, and has a second cross-arm 41 having a flat-sided slot 42 formed therein, and the fixed head 43 of the collapsible and expansible vessel has formed thereon a squared or flat-sided boss 44, of such dimensions as to fit snugly within the slot 42, and projecting through said slot, the projecting end 45 being screw-threaded as shown. The flexible tube 38 is soldered or brazed into an opening in the screw-threaded projection 45, which opening is prolonged through the head 43 and through an inwardly projecting tubular portion 46 telescoping with a like tubular projection 47 projecting from the movable head 48 of the expansible and collapsible vessel 37, these two telescopic members 46 and 47 constituting a stop to limit the collapsing action of the vessel and restricting the relative movement of the heads of the vessel to rectilinear motion. Integral with the movable head 48 of the vessel 37 is a T-head 49 which slips easily but snugly into the T-slot 29' on the nut 29 of the power transmission stem 4. Formed centrally through the T-head 49 and through the movable head 48 is a filling opening 50, which opening, after the vessels have been filled with a non-compressible liquid, is closed by a stopper and preferably sealed by brazing a cap over the stopper, or by a drop of solder.

When the T-head 49 is slipped into the T-slot 29' on the nut 29, and the boss 44 is slid within the slot 42 on the frame, a nut 51 is screwed onto the screw-threaded projection 45 on the fixed head 43, firmly clamping the parts in position, the squared boss 44 engaging the slot 42, and effectively preventing any twisting or turning action being imparted to the flexible tube 38. The movable head 52 of the expansible and collapsible vessel 39 has formed integral therewith, a T-head fitting within the T-slot of the member 35, exactly similar to that formed on the vessel 37, and also has a squared boss 53 fitting into a slot 54 in the frame 36 and is clamped in position by a nut 55, exactly similar to the manner in which the other vessel 37 is mounted on its frame 40, 41, and is also provided with telescopic members 56 limiting and restricting to rectilinear motion the collapsing movement of the vessel 39, similar to the telescopic members previously described in connection with the vessel 37. In fact, the manner of connecting the flexible tube to the expansible vessels 37 and 39, the means of clamping the unit to the respective frames, and the means of connecting the unit to the power transmission rod of the thermostat and the valve rod of the valve mechanism are exactly similar in every respect, as well as the means for filling the same.

Communication between the telescopic member 46 and the interior of the collapsible and expansible vessel 37 is afforded through an opening 57 in the telescopic member 47, and a similar opening 58 is provided for affording communication between the expansible and collapsible vessel 39 and the tube 38.

In Fig. 1, the parts are shown in their adjusted and operative position. When the parts are in this position, the temperature at which the device will operate may be regulated by turning the nut 24 to vary the pressure on the spring 25 and hence the pressure on the expansible and collapsible vessel 2.

In case of injury to any portion of the power transmission unit C, it is only necessary to loosen the nuts 51 and 55, when the two squared bosses 44 and 53 may be slid out of the slots in the respective frames and the T-heads on the movable heads of the two expansible and collapsible vessels slipped out of the respective T-slots, as will be readily understood from an inspection of Fig. 2. The parts may be then re-assembled or a new transmission member C inserted in position by slipping the T-heads of the respective expansible and collapsible vessels into the T-slots of the transmission rod and the valve rod, slipping the squared bosses 53 and 44 into the slots 54 and 42 and tightening the nuts 55 and 51.

The power transmission unit as thus constructed can be quickly and accurately assembled in operative relation to the other parts by any unskilled person without danger of twisting or straining the conduit 38 which is the delicate member of such unit. This is a matter of special importance if a new transmission unit is to be substituted for an injured one since it avoids the expense of employing a highly skilled mechanic to effect the substitution.

It will be observed that, upon a rise of temperature within the tank D, the expansion of vapors in the bulb 1 will force liquid through the tube 9 into the expansible and collapsible vessel 2 to expand the same, forcing the rod 4 outward and tending to collapse the vessel 37 and force the liquid therein through the flexible tube 38 into the vessel 39, expanding the same and forcing the valve rod downward to close the valve 32. A reverse movement will, by reason of the elasticity of the vessel 39, cause the liquid to be returned from the vessel 39 to the vessel 37, opening the valve. In case the temperature in the tank should continue to rise after the valve 32 has been fully seated, provision is made for preventing undue strain upon the parts, by imparting to the flexible walls of the vessels 37 and 39 such elasticity that their elastic limit will not be exceeded by any overthrow of the thermostat after the valve has become closed.

As previously stated, in a regulator of the construction herein described, it is extremely desirable that the vapors of the thermosensitive liquid in the bulb 1 should be effectively trapped within the bulb and their pressure transmitted through the liquid into the expansible and collapsible vessel 2. This is secured by any suitable means for trapping the vapors within the bulb while permitting the liquid to be expelled therefrom by pressure of the vapors. As here shown, the open end of the tube 9 is so positioned that such end is always covered with liquid and the vapor is thereby prevented from escaping therethrough. This renders it desirable, if the bulb is to be installed in horizontal position, to have it always installed with the open end of the tube 9 downward, and any suitable index mark or other provision may be made for insuring that it shall be installed in this position. Manifestly, when the bulb 1 is inserted in a vertical position, with the open end of the tube 9 downward, no such indicating mark is necessary.

It will be seen that, by the present invention, there is provided simple and effective means for installing the thermostatic element A in the tank D; that such element is provided with a minimum number of brazed or soldered joints; that the power transmitting element C may be quickly removed from, or placed in position in connection with, the thermostatic element A and the valve mechanism B by unskilled persons and without danger of twisting or straining any of the parts in the act of clamping such element C in position. This is a matter of great importance, since it avoids injury in the installation and provides a durable, light, and effective mechanism for transmitting the power from the thermostat to the valve, and also provides means, unyielding in the direction of the thrust of the vessel 39 on the valve stem, and yet at the same time, notwithstanding such unyielding action, avoids any strain on the parts due to a possible overthrow of the thermostat.

What is claimed is:—

1. In combination with valve mechanism, a thermostat, means for operating said valve mechanism from said thermostat including two expansible and contractible vessels and a tube connecting the same, said vessels having an elastic limit sufficient to absorb the overthrow of the thermostat and being charged with a power-transmitting fluid and constituting a readily attachable and detachable unit, and means, unyielding in the direction in which power is transmitted, for attaching said unit to and detaching it from said valve mechanism and thermostat without disturbing the valve mechanism or thermostat.

2. In combination, a thermostat, mechanism to be operated by said thermostat, means for operating said mechanism from said thermostat including communicating expansible and contractible vessels, said vessels having an elastic limit sufficient to absorb the over-throw of the thermostat and being charged with a power-transmitting fluid and constituting a readily attachable and detachable unit, and means, unyielding in the direction in which power is transmitted for attaching said unit to and detaching it from said mechanism and thermostat, without disturbing the mechanism or thermostat.

3. In a device of the character described, the combination of a valve mechanism and a thermostat each of which is provided with a slotted frame, with a power-transmitting unit including two expansible and contractible vessels and a flexible tube connecting them, said vessels and tube being filled with a power-transmitting fluid, each of said vessels having a boss on one head thereof and fitting into the slot in the respective frames, and each vessel having a member of a T-joint on its other head and coacting with a companion T-joint member operatively connected respectively to the thermostat and the valve, and means securing said bosses in position in their respective frames.

4. In combination, a thermostat, mechanism operated by said thermostat, said operated mechanism and thermostat being provided with a slotted frame, a power-transmitting unit including two expansible and contractible vessels, and a tube connecting them, said vessels and tube being filled with a power-transmitting fluid, each of said vessels having a boss on the head thereof and fitting into the slot in the respective frames, and each vessel having a member of a T-joint on its other head and coacting with a companion T-joint member operatively connected respectively to the thermostat and operated mechanism, and means securing said bosses in position in their respective frames.

5. In a device of the character described, the combination of an expansible and contractible vessel, a flanged member forming one head of said vessel and provided with a hub having a screw-threaded portion for securing said member to a tank or other wall, a bulb attached to said hub, a conduit in said hub connecting said bulb and vessel, and a frame cap having a central opening through which said hub passes and non-rotatable with respect thereto whereby said cap and member may be rotated as a unit to insert the threaded portion of said hub in said wall.

6. In a device of the character described, the combination of a bulb and a contractible and expansible vessel, a flanged member forming one head of said vessel, and having a hub to which said bulb is attached and a conduit in said hub connecting said bulb and vessel, a frame surrounding said vessel, and having an opening through which said hub passes, and means for securing said hub non-rotatably in said opening said means comprising a lug formed on said frame for engaging a slot in said flanged member, and a nut threaded on said hub.

7. In a tank regulator, the combination of a valve mechanism and a frame connected thereto, a thermostatic element consisting of an expansible and collapsible vessel, the fixed head of which is provided with a hub having a conduit leading therethrough and a bulb on said hub, a frame having a cap secured to the fixed head of the expansible and collapsible vessel in non-rotatable relation therewith, a power-transmitting unit connecting the thermostatic element with said valve mechanism, said unit consisting of two expansible and collapsible vessels and a tube connecting them, said vessels and tubes being filled with a power-transmitting fluid, each of said vessels having a boss on one head thereof fitting into a slot in the respective frames of the valve mechanism and the thermostatic element, means for locking said bosses in the respective frames, and one member of a T-joint on the head of each vessel opposite the head carrying said boss, said T-joint members coacting with companion T-joint members operatively connected respectively to the thermostatic element and the valve mechanism.

In testimony whereof I have signed this specification.

WESTON M. FULTON.